INVENTOR.
Jerry R. Marlow
ATTORNEY

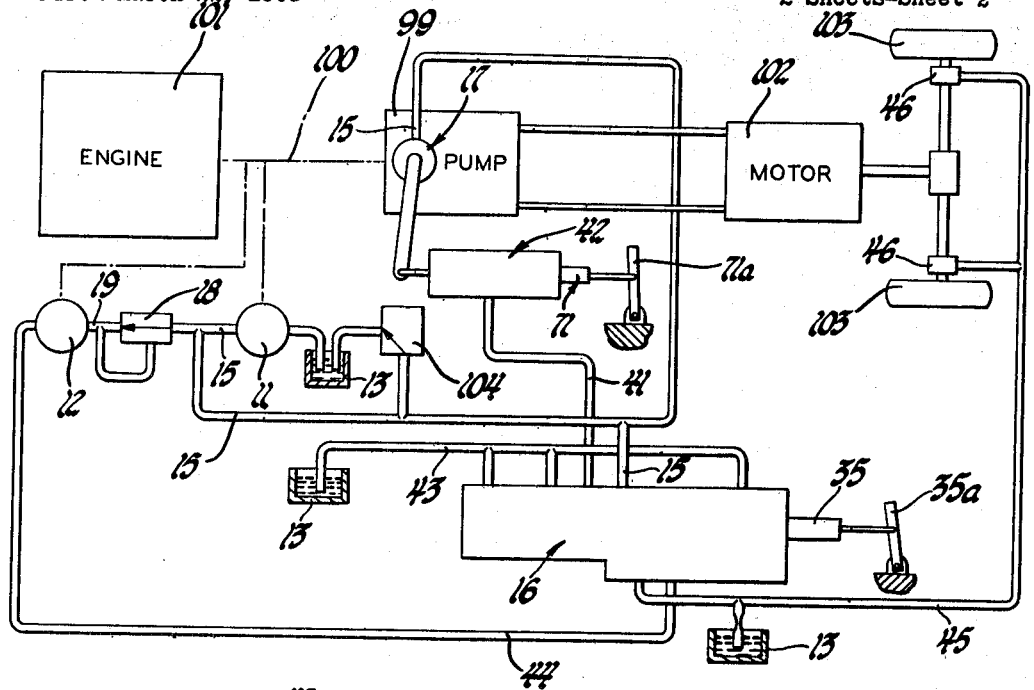
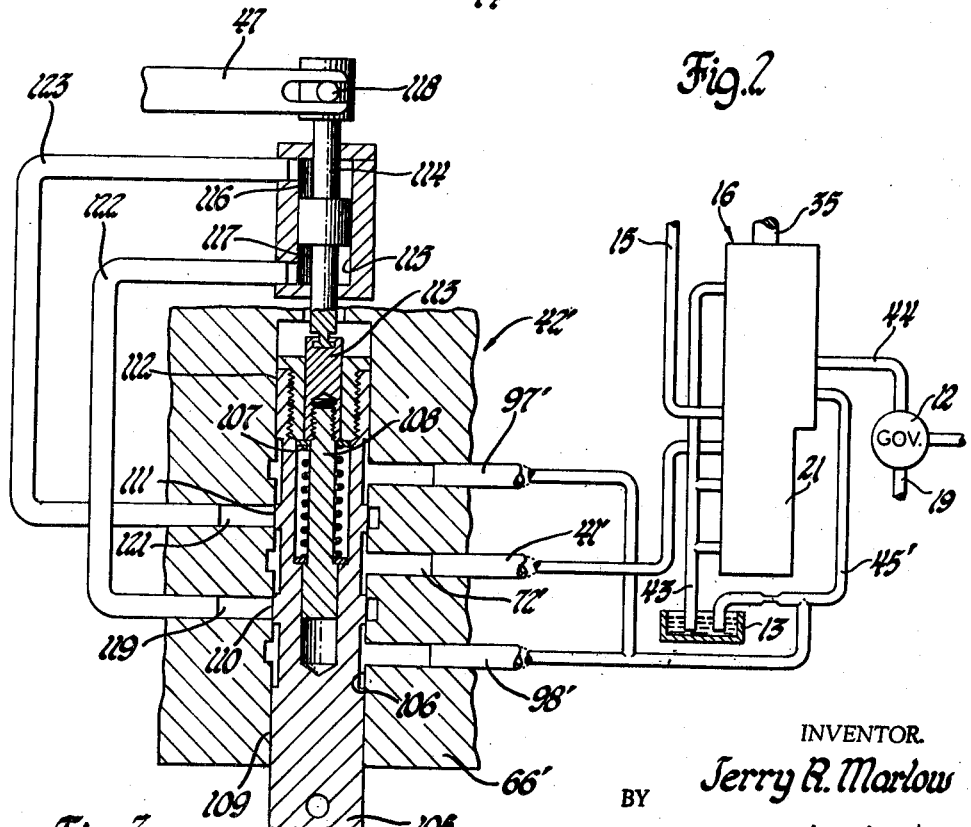

United States Patent Office 3,495,405
Patented Feb. 17, 1970

3,495,405
HYDROSTATIC TRANSMISSION WITH HYDRAULIC CENTERING ACTUATOR
Jerry R. Marlow, Greenwood, Ind., assignor to General Motors Corporation, Detroit, Mich., a corporation of Delaware
Filed Mar. 22, 1968, Ser. No. 715,213
Int. Cl. F16d 31/00, 31/08, 20/00
U.S. Cl. 60—52                                                13 Claims

ABSTRACT OF THE DISCLOSURE

A hydraulic centering or power limiting actuator for a hydraulic unit, such as a pump or a pump-motor hydrostatic drive, which prevents the hydraulic unit from causing a power overload on the prime mover is herein disclosed. The actuator includes a manual control connected through a lost motion spring to a hydromechanical control which, in turn, is connected to a servo control for the hydraulic unit. Movement of the manual control controls the displacement of the hydraulic unit unless an overload or overspeed condition exists. The hydromechanical control to increase the displacement of the hydraulic unit. trol, through the lost motion spring, to reduce the displacement of the hydraulic unit so that the hydraulic unit operates at a lower input power level. The hydromechanical control, sensing the overspeed, overrides the manual control to increase the displacement of the hydraulic unit.

This invention relates to controls for a hydraulic unit and more particularly to power limiting controls wherein the displacement of the hydraulic unit is reduced automatically to prevent prime mover overload.

The invention is particularly useful in hydraulic drives where the hydraulic pump is capable of absorbing more power than the prime mover can deliver. In such drives, if the power input requirement of the pump is too great, the prime mover will quite often be stalled by the load thereby preventing further drive until the prime mover is restarted.

It is an object of this invention to provide in a hydraulic power transmission having a power control, a power limiting actuator device, between the operator and the power control which will automatically limit the power absorbing capacity of the hydraulic transmission regardless of the power setting established by the operator.

Another object of this invention is to provide in a hydrostatic transmission, a power limiter having a manual control to permit the operator to select a desired drive ratio and input power requirement and a hydromechanical actuator to override the manual control and limit the input power requirement to a level below that established by the operator.

draulic ratio control, for a prime mover driven hydraulic unit, having a manual control which will permit the operator to select a hydraulic ratio and a hydromechanical ratio control, cooperating with the manual control, to automatically select a hydraulic ratio below the ratio selected by the operator if a prime mover power overload should occur, and a hydraulic ratio above the ratio selected by the operator if a prime mover overspeed should occur.

This and other objects of the invention will become more apparent from the following description of the invention illustrated by the accompanying drawings in which:

FIGURE 2 is a diagrammatic view showing a hydraulic drive circuit in which the actuator is used.

FIGURE 3 is a plan view, in section, showing a modification of the actuator.

Figure 1:
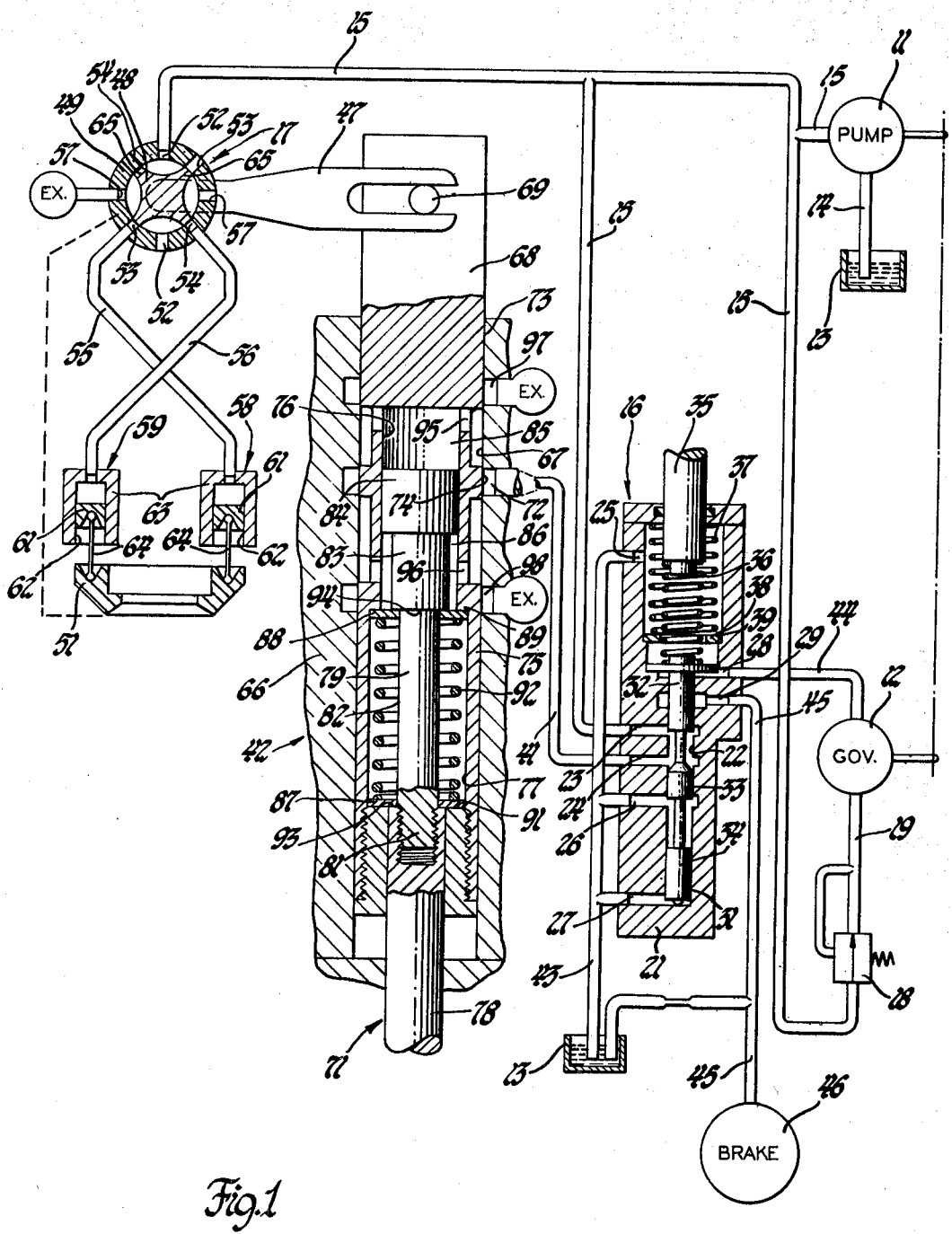
FIGURE 1 is a diagrammatic view partly in section showing the actuator connected to a hydraulic unit and a power signal device.

Referring now to the drawings, wherein like reference characters represent like or corresponding parts throughout the several views, there is shown in FIGURE 1 a pump 11 and a governor 12 both adapted to be driven by an engine. The pump 11 draws fluid from a sump 13 via passage 14 and delivers fluid, under pressure, via passage 15 to a control valve 16, a servo device 17 and a reducing valve 18 which, in turn, delivers fluid via passage 19 to the governor 12. The control valve 16 has a valve body 21 having a bore 22 and fluid ports 23, 24, 25, 26, 27, 28 and 29, a valve spool 31 slidably disposed in the bore 22 having a plurality of lands 32, 33 and 34, a throttle link 35, a spring 36 held in compression between the spool 31 and the throttle link 35, and a spring 37 held in compression between one end of the bore 22 and a washer 38 which abuts a shoulder 39 in the bore 22. The inlet port 23 is connected to receive fluid via passage 15 from pump 11 while the outlet port 24 is connected to deliver fluid via a passage 41 to a power limiter or hydraulic centering actuator 42. The ports 25, 26 and 27 are exhaust ports which are connected via passage 43 to the sump 13. Port 28 is connected with the governor 12 via passage 44, while port 29 is connected via passage 45 to a brake 46. The control valve 16 receives signals from the prime mover throttle control and governor which are converted to forces acting on the valve spool 31 to cause the valve spool 31 to open the inlet port 23 to the outlet port 24 if a power overload is present or to open the inlet port 23 to the brake apply port 29 if a prime mover overspeed condition is present. The control valve 16 is disclosed in application United States Ser. No. 709,007, filed Feb. 28, 1968.

The servo device 17 includes a rotary input member 47 secured to a rotary valve spool 48 which is rotatably supported in a servo valve 49, rotatably supported in a servo housing, not shown, and operatively connected to a swash plate 51 of a hydraulic unit such as a pump. The sleeve valve 49 has a servo inlet 52 connected to passage 15, servo outlets 53 and 54 connected to passages 55 and 56 respectively, and exhaust ports 57. The passages 55 and 56 are connected to fluid motors 58 and 59 respectively which are operative, in response to fluid pressure in passages 55 and 56 to control the position of swash plate 51 and thereby control the displacement of the pump. The fluid motors 58 and 59 are identical in construction with each having a piston 61 slidably mounted in a bore 62, of a pump housing 63, and a piston rod 64 which operatively connects the pistons 61 to the swash plate 51. In operation the input member 47 and the valve spool 48 are rotated permitting pressure fluid to flow from servo inlet 52 to one of the servo outlets 53 or 54 while the other servo outlet is connected to exhaust port 57. The pressure fluid is directed to the appropriate fluid motor 58 or 59 via passage 55 or 56; so that the pressure fluid acts on one of the pistons 61 causing it to stroke in its bore 62 and thereby through the connecting rod 64, rotate the swash plate 51. The rotation of the swash plate is transmitted to the servo sleeve valve 49 so that the servo inlet 52 is disconnected from the servo outlets 53 or 54 by lands 65 on the valve spool 48 when the swash plate 51 has achieved the angle established by the input member 47 and, therefore, the pump displacement desired by the operator.

Pump displacement and pump pressure are two primary factors which determine the amount of power to be absorbed by the hydraulic unit or the amount of power which the hydraulic unit can convert from mechanical power to fluid power. The amount of power available to the hydraulic unit is dependent upon the prime mover driving the hydraulic unit. Thus it is possible for the operator to establish fluid power requirements in excess of power availability. If this condition occurs, either stalling of the prime mover will occur or mechanical failure of the prime mover or the hydraulic unit may occur. To prevent the occurrence of power overload conditions, a power limiter or hydraulic centering actuator, such as 42, may be placed between the operator and the servo control for the hydraulic unit.

The power limiter 42 is comprised of a housing 66 having a bore 67, a hydromechanical actuator 68 slidably disposed in bore 67 and operatively connected by a pin 69 to the servo input member 47, and a manual input member 71. An inlet port 72 is connected via passage 41 to a control valve 16. The hydromechanical actuator 68 has three equal diameter lands 73, 74, and 75, an inner cylinder portion 76 and a spring chamber 77. The manual control 71 has a rod portion 78 and a piston portion 79 which has a threaded end 81 through which it is secured to the rod member 78. The piston portion has three diameters 82, 83 and 84 which are of different sizes. The largest, 84, is slidably disposed in the cylinder 76 of the hydromechanical actuator 68 thereby forming two chambers 85 and 86 and cooperating with the actuator 68 to form two expansible fluid motors between the ends of cylinder bore 76 and spring chamber 77. Two spring seats 87 and 88 are disposed within the spring chamber 77 and are held against shoulders or abutments, 89 and 91 of the hydromechanical actuator 68, respectively by a spring 92. Shoulder portions or abutments 93 and 94 on the manual input member 71 are also adapted to engage the spring seats 87 and 88 respectively, thus providing a resilient or lost motion connection between the manual input member 71 and the fluid actuator 68. The chamber 85 is communicated to the annular recess between lands 73 and 74 by a plurality of radial ports 95 while the chamber 86 is communicated to the annular recess between lands 74 and 75 by a plurality of radial ports 96.

The power limiter or hydraulic centering actuator 42 permits a manual input force on the manual control 71 to be transmitted via spring 92 to the hydromechanical actuator 68 and the rotary servo input member 47 so that the displacement of the hydraulic unit may be controlled manually to provide either forward or reverse fluid flow. When the hydromechanical actuator 68 is moved by the operator through the use of the manual control 71, the port 72 is opened by land 74 to either chamber 85 or 86 by radial passages 95 or 96 respectively. In the event that an overload is experienced by the prime mover as determined by the prime mover throttle force which is transmitted through throttle link 35 and the governor force which is transmitted via the governor 12 to the valve spool 31 of the control valve 16 so that the port 23 is opened to port 24 and an overload signal is present in passage 41 which is transmitted to either chamber 85 or 86 as described above, it thereby produces a pressure signal in the appropriate chamber to cause the hydromechanical actuator 68 to be moved relative to the manual control 71 and reduce the displacement of the hydraulic unit thereby relieving the overload condition. The spring member 92 is so connected to the spring seat 87 and 88 to permit this relative movement between the fluid actuator 68 and the manual member 71. As the load on the prime mover decreases and, therefore, the overload signal is removed, the spring member 92 will move the hydromechanical actuator 68 until it assumes the position as determined by the manual control 71. To prevent the pressure build-up in the chambers 85 or 86 when they are not opened to port 72, two exhaust ports 97 and 98 are provided. When the fluid actuator is moved upward, to establish forward flow, chamber 85 is exhausted via port 97 and when the fluid actuator is moved downward, to establish reverse flow, chamber 86 is exhausted via port 98.

FIGURE 2 shows the use of the centering actuator 42 in a hydrostatic type vehicle drive transmission in which a pump 99 is driven through a power input shaft 100 by an engine 101 to produce fluid power for a hydraulic motor 102 which, in turn, drives the vehicle wheels 103. A pressure relief valve 104 is provided in the control circuit to limit the pressure level of the fluid supplied to the servo 17 in the control valve 16. To drive the vehicle, the operator moves a control lever 71a either clockwise or counterclockwise to establish either forward or reverse flow from the pump 99 to the motor 102. The operator also moves the throttle pedal 35a which is connected to the throttle linkage 35 of control valve 16 and to the engine 101 by a linkage, not shown, to establish a power level at the engine 101. Unless the drive resistance, at the wheels 103, is greater than the power setting of the engine 101, the vehicle will be put in motion. As the vehicle is moving, if the drive resistance increases, for example, if an upgrade is encountered, the engine speed will decrease thereby causing a decrease in governor force on the control valve 16. If the drive resistance is sufficient, the governor force will be decreased sufficiently to permit the throttle force, on control valve 16, to open the control valve 16 so that control fluid in passage 15 is directed through passage 41 to the power limiter 42. The power limiter will then function, as described above, to reduce the displacement of pump 99 and thereby reduce the load on the engine 101. When the drive resistance decreases, engine speed will increase to cause an increase in governor force on control valve 16 so the control fluid will be disconnected from the power limiter 42 so that the pump displacement will return to the value established by the operator through the control lever 71a.

FIGURE 3 shows a power limiter 42' which is a modification of the power limiter 42 shown in FIGURE 1. The power limiter 42' includes an operator control 105 slidably disposed in a valve bore 106 and operatively connected via spring 107 to a hydromechanical actuator 108. The operator control 105 has four equal diameter lands 109, 110, 111 and 112 which are spaced along the diameter of the operator control 105. The hydromechanical actuator 108 has a rod member 113 slidably disposed in the operator control 105 and a piston member 114 slidably disposed in a cylinder member 115, which is a stationary member that may be secured to the actuator housing 66' or to some other stationary member, to form two equal area chambers 116 and 117 and is operatively connected by a pin 118 to servo input member 47. The valve bore 106 has an inlet port 72', two outlet ports 119 and 121 connected via passages 122 and 123 to chambers 117 and 116 respectively, and two overspeed and exhaust ports 97' and 98'. Movement of the operator control 105 permits its fluid communication between inlet port 72' and either port 119 or 121 and their respective chambers 117 or 116 so that if an overload signal is present in line 41', it will be communicated to either chamber 116 or 117 thereby reducing the displacement of the hydraulic unit as described above.

The power limiter 42' also provides an engine overspeed control. A passage 45' is connected between the control valve 16 and the overspeed and exhaust ports 97' and 98'. Assuming the operator has moved the operator control 105, thereby establishing a hydraulic ratio between a hydrostatic pump, such as 99 in FIGURE 2, and a drive motor, such as 102 in FIGURE 2, a drive ratio between the engine and load is established. If the load drives the engine, such as during downgrade coasting of a vehicle, the engine may overspeed. During downgrade coasting, the drive motor operates as a pump to drive the hydrostatic pump as a motor. If engine overspeed occurs, the valve spool 31 is moved upward in bore 22 due to the governor force supplied via passage 44 to the control valve 16. As the valve spool 31 moves upward, passage 15 is opened to passage 45' and overspeed and exhaust ports 97' and 98', thereby supplying fluid, under pressure, to the power limiter 42'. If the operator control 105 has been upward, the port 98' is open between lands 109 and 110 to chamber 117 so that the fluid, under pressure, acts on the piston member 114 to urge it upward in the cylinder member 115 thereby increasing the displacement of the hydrostatic pump. As the displacement of the hydrostatic pump increases, the speed of the hydrostatic pump will decrease thereby decreasing the speed of the engine to prevent overspeeding. This overspeed control may also be used with the power limiter 42 by connecting exhaust passages 97 and 98 to passage 45 in the FIGURE 1 modification.

One operating difference between the power limiters 42 and 42' is the areas of the chambers 85 and 86 in power limiter 42 and the chambers 116 and 117 in power limiter 42'. The chambers 85 and 86 are of unequal areas and thus provide a quicker response, in one direction, to an overload signal. The chambers 116 and 117 are of equal area and, therefore, have equal response times. The power limiter 42 is of more simple construction and is, therefore, the preferred embodiment unless unequal response to overload is critical to the system design.

Another operating difference between the power limiters 42 and 42' is that, in the power limiter 42', the reaction of the force in chamber 116 or 117, the friction forces of the servo 17, and the reaction of the spring 107 must be held by the operator through the operator control 105; whereas in the power limiter 42 these reaction forces are contained within the hydromechanical actuator 68 and rod member 78 so that the only feedback forces to the operator control 71 are friction forces.

The power limiter is also useful in controlling hydraulic accessories found on working vehicles such as industrial trucks, farm tractors, and earth moving machines. In the above mentioned vehicles and others, the prime mover serves two functions. First, to provide a drive for the vehicle and secondly, to provide power to operate the hydraulic accessories. The hydraulic accessories, if operated by a variable displacement hydraulic unit, can be automatically controlled, through the use of the present invention, so that the prime mover will not be overloaded by the hydraulic accessories when power to drive the vehicle is needed during operation of the accessories.

Many modifications and variations are possible in light of the above teachings. It is, therefore, to be understood that within the scope of the appended claims, the invention may be practiced otherwise than as specifically described.

What is claimed is:

1. In combination a hydrostatic transmission including power input means drivingly connected to variable displacement hydraulic pump having a displacement control and an input power requirement, a hydraulic drive motor operatively connected to said hydraulic pump and driven thereby, and output means for operatively connecting said hydraulic motor to a load to be driven thereby; power limiting actuator means including a selectively operable manual control, hydromechanical actuator means operatively connected to said displacement control, and lost motion spring means operatively connected between said manual control and said hydromechanical actuator means to provide unitary movement of said manual control and said hydromechanical actuator means when said input power requirement is at one level and to permit relative movement between said manual control and said hydromechanical actuator means when said input power requirement is at another level; and input power signal means operatively connected between said power input means and said power limiting actuator means for providing an input power signal to said power limiting actuator means when said input power requirement is at said another level.

2. The invention defined in claim 1 and said input power signal means including input speed signal means, responsive to the speed of said input power means, for providing an input speed signal to said power limiting actuator means when the speed of said input power means is greater than a predetermined value.

3. The invention defined in claim 1 and said power limiting actuator means further including a valve body having a bore with one of said hydromechanical actuator means and said manual control slidably mounted therein, passage means in said valve body communicating said bore with said hydromechanical actuator means, an inlet port having fluid connecting with said input power signal means, and exhaust port means communicating with said valve bore; and valve control means on one of said hydromechanical means and said manual control for providing selective fluid communication between said inlet port and said passage means and said exhaust port and said passage means.

4. A hydraulic pressure system comprising in combination power input means; variable displacement hydraulic unit means, having an input power requirement, drivingly connected to said power input means for providing a fluid pressure when driven by said power means; displacement control means operatively connected to said hydraulic unit for controlling the displacement thereof; power limiting means for limiting the input power requirement of said hydraulic unit including manual control means, hydromechanical control means operatively connected to said displacement control means, and lost motion spring means operatively connected between said manual control means and said hydromechanical control means for providing unitary movement of said manual control means and said hydromechanical control means when said input power requirement is at one level and for permitting relative movement between said manual control means and said hydromechanical control means when said input power requirement is at another level; and input power signal means is operatively connected between said power input means and said power limiting means for providing an input power signal to said power limiting means when said input power requirement is at said another level.

5. The invention defined in claim 4 and said manual control means including a first and second shoulder portion; said hydromechanical actuator means including a first abutment adjacent said first shoulder portion and a second abutment adjacent said second shoulder portion; and said lost motion spring means including a first spring seat abutting said first shoulder portion and said first abutment when said input power requirement is at said one level and abutting one of said first shoulder portions and said first abutment when said input power requirement is at said other level, a second spring seat abutting said second shoulder portion and said second abutment when said input power requirement is at said one level and abutting one of said second shoulder portions and said second abutment when said input power requirement is at said other level, and a spring member compressed between said first and second spring seats.

6. A power limiting actuator means for use with a variable displacement hydraulic unit including selectively operable servo means for varying the displacement of the hydraulic unit to establish an input power requirement therefore including a manually operable member, a fluid operated member operatively connected to said servo means, and lost motion means, operatively connected between said manually operable member and said fluid operated member, for providing at one time unitary movement of said manual operable member and said fluid operated member and at another time permitting relative movement between said manually operable and fluid operated members; and power signal means operatively connected to said fluid operated member for providing an overload power signal to said fluid operated member, to establish relative movement between said manual member and said fluid member when said overload power signal is present, to reduce the displacement of said hydraulic unit to limit the power requirements of said hydraulic unit.

7. The invention defined in claim 6 and said power signal means including overspeed means, operatively connected to said fluid operated member, for providing an overspeed signal to said fluid operated member, to establish relative movement between said manual member and said fluid member when said overspeed signal is present to increase the displacement of said hydraulic unit.

8. The invention defined in claim 6 and said lost motion means including a pair of spaced shoulders on each of said fluid operated member and said manually operable member, a spring compressed between one of said shoulders on said fluid operated member and said manually operable member and the other of said shoulders on said fluid operated member and said manually operable member to provide said unitary movement, said spring being further compressible between one of said shoulders on said fluid operated member and the other of said shoulders on said manually operable member to provide said relative movement.

9. A power limiting actuator including cylinder means, piston means slidably disposed in said cylinder means and cooperating therewith to provide a fluid motor inoperable at one time and operable at another time, and lost motion spring means operatively connecting said cylinder means and said piston means to provide unitary movement between said cylinder means and said piston means when said fluid motor is inoperable and relative movement between said cylinder means and said piston means when said fluid motor is operable.

10. Power limiting actuator means for controlling a servo controlled hydraulic unit, having an input power requirement, including hydromechanical actuator means operatively connected to said servo controlled hydraulic unit, manual control means in slidable circumjacent relation with said hydromechanical actuator means, lost motion spring means for maintaining unitary movement of said hydromechanical actuator means and said manual control means to operate said servo controlled hydraulic unit, and expansible fluid motor means operatively connected to said hydromechanical actuator to override said lost motion spring means to provide relative movement between said hydromechanical actuator means and said manual control means to operate said servo controlled hydraulic unit to limit the input power requirement thereof.

11. The invention defined in claim 10 and said power limiting actuator means further including a valve body having a bore, with one of said hydromechanical actuator means and manual control means slidably disposed therein, a fluid inlet port, and fluid exhaust port means communicating with said valve bore; passage means communicating said bore in said valve body with said expansible fluid motor means; and valve control means, on one of said hydromechanical actuator means and said manual control means, for providing selective fluid communication between said inlet port and said passage means and said exhaust port and said passage means; and power signal means, operatively connected to said inlet port, for providing a fluid power signal thereto.

12. The invention defined in claim 11 and said expansible fluid motor means including a cylinder portion secured to said hydromechanical actuator means and a piston member, slidably disposed in said cylinder portion, secured to said manual control means.

13. The invention defined in claim 11 and said expansible fluid motor means including a stationary housing member having a cylinder portion therein, and a piston member, slidably disposed in said cylinder portion, secured to said hydromechanical actuator means.

References Cited

UNITED STATES PATENTS

| 2,214,552 | 9/1940 | Ferris. | |
| 2,896,411 | 7/1959 | Bowers et al. | |
| 3,003,309 | 10/1961 | Bowers et al. | 60—19 |
| 3,142,157 | 7/1964 | Firth et al. | 60—53 |
| 3,302,390 | 2/1967 | Christenson et al. | 60—19 |
| 3,371,479 | 3/1968 | Yapp et al. | 60—19 |

EDGAR W. GEOGHEGAN, Primary Examiner

U.S. Cl. X.R.

60—19, 53

UNITED STATES PATENT OFFICE
CERTIFICATE OF CORRECTION

Patent No. 3,495,405  Dated February 17, 1970

Inventor(s) Jerry R. Marlow

It is certified that error appears in the above-identified patent and that said Letters Patent are hereby corrected as shown below:

Column 1, line 23 through 28, "control to increase the displacement of the hydraulic unit. trol, through the lost motion spring, to reduce the displacement of the hydraulic unit so that the hydraulic unit operates at a lower input power level. The hydromechanical control, sensing the overspeed, overrides the manual control to increase the displacement of the hydraulic unit." should read -- control, sensing the overload, overrides the manual control, through the lost motion spring, to reduce the displacement of the hydraulic unit so that the hydraulic unit operates at a lower input power level. The hydromechanical control, sensing the overspeed, overrides the manual control to increase the displacement of the hydraulic unit. --.

Column 1, line 55, delete "draulic" and insert -- It is a further object of this invention to provide a hydraulic. --.

Column 2, line 37, after "servo" insert -- sleeve --.

SIGNED AND
SEALED
AUG 25 1970

(SEAL)
Attest:

Edward M. Fletcher, Jr.
Attesting Officer

WILLIAM E. SCHUYLER, JR.
Commissioner of Patents